Sept. 8, 1925. 1,552,526
J. M. WESTERLIN
APPARATUS FOR COOLING WATER
Filed March 10, 1924 3 Sheets-Sheet 1
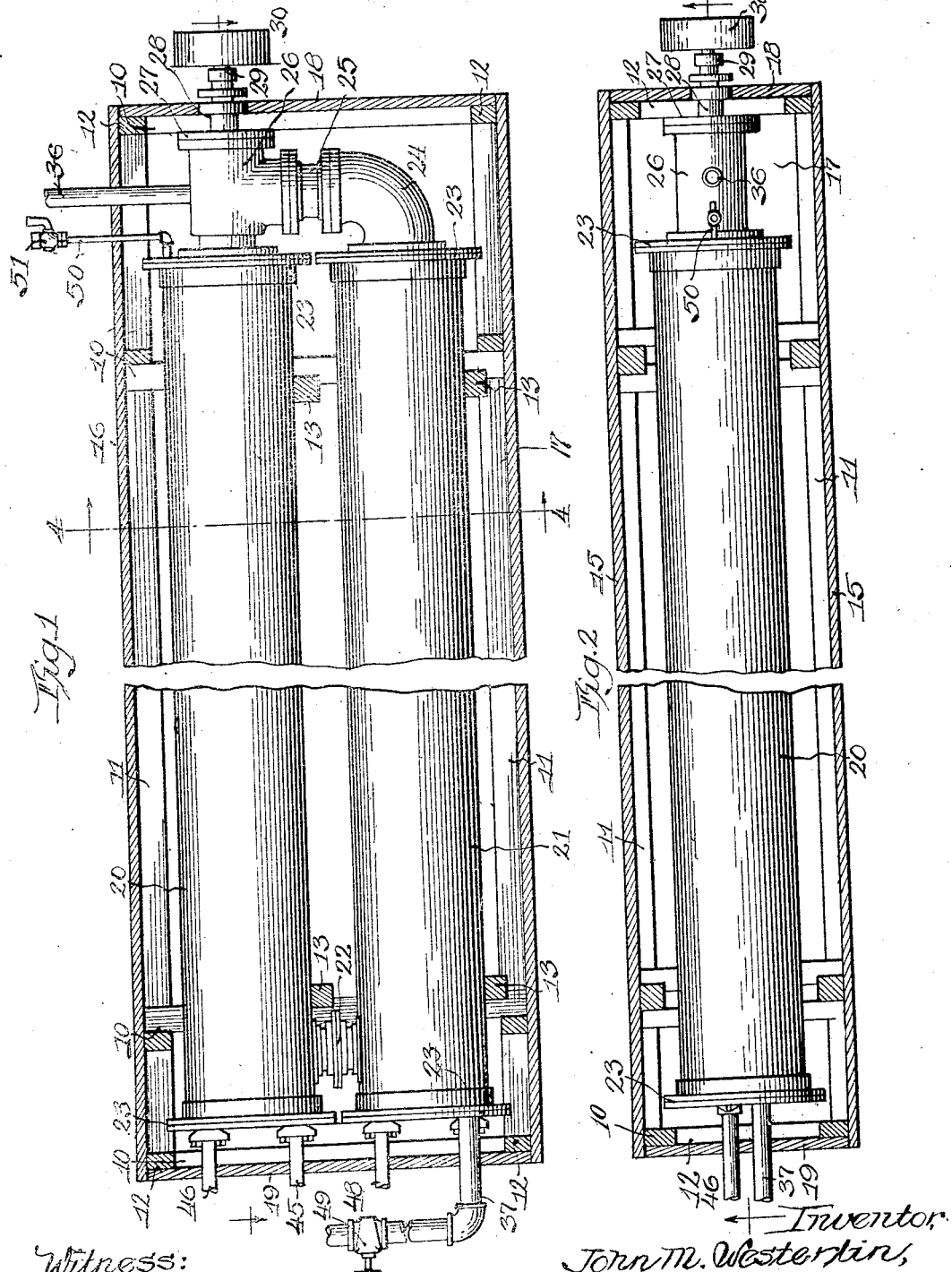
Witness:
Chas. R. Kursh
Inventor
John M. Westerlin
By Thomason, Woodhouse & Lundy Attys Sept. 8, 1925.  1,552,526
J. M. WESTERLIN
APPARATUS FOR COOLING WATER
Filed March 10, 1924  3 Sheets-Sheet 2
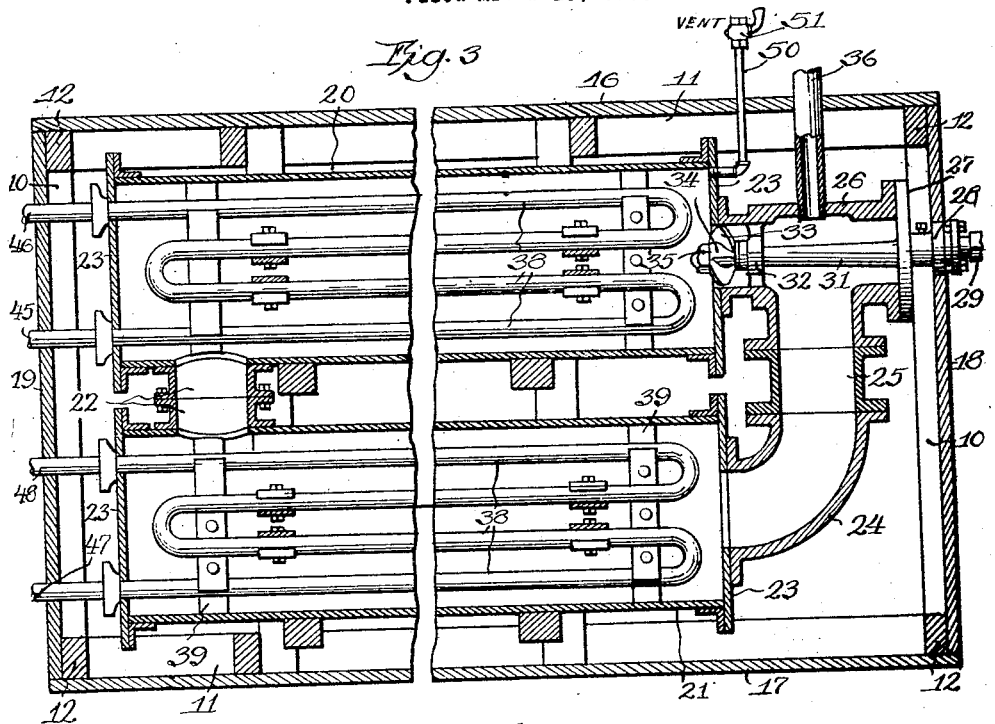
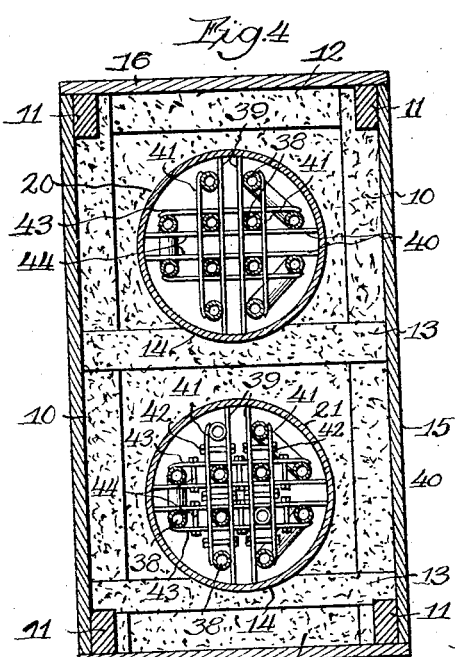

Sept. 8, 1925.  
J. M. WESTERLIN  
1,552,526  
APPARATUS FOR COOLING WATER  
Filed March 10, 1924  
3 Sheets-Sheet 3
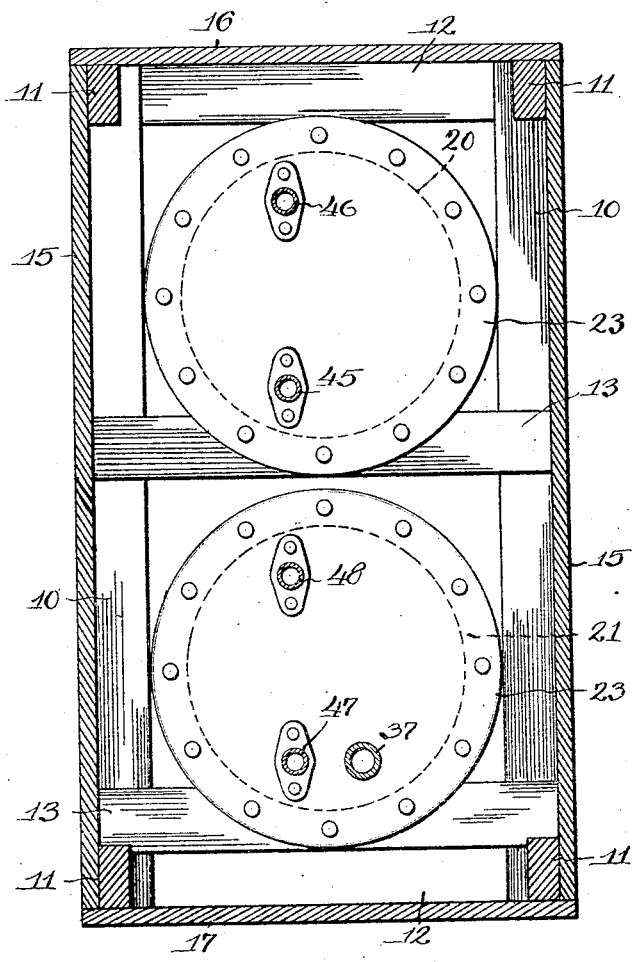
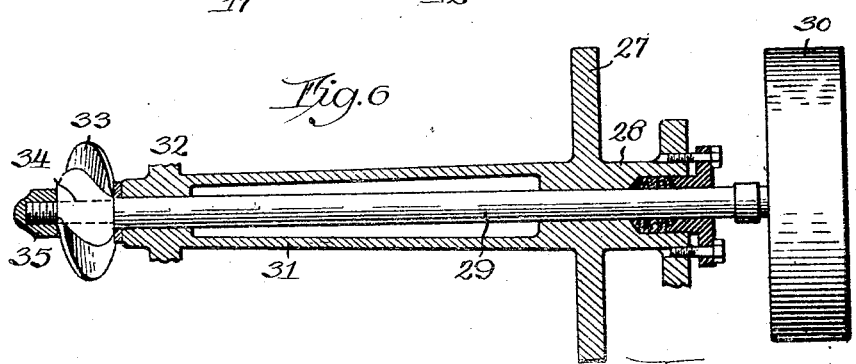
Inventor,
John M. Westerlin, Patented Sept. 8, 1925.

1,552,526

UNITED STATES PATENT OFFICE.

JOHN M. WESTERLIN, OF CHICAGO, ILLINOIS, ASSIGNOR TO WESTERLIN AND CAMPBELL COMPANY, OF CHICAGO, ILLINOIS, A CORPORATION OF ILLINOIS.

APPARATUS FOR COOLING WATER.

Application filed March 10, 1924. Serial No. 698,219.

*To all whom it may concern:*

Be it known that I, JOHN M. WESTERLIN, a citizen of the United States, residing at Chicago, in the county of Cook and State of Illinois, have invented certain new and useful Improvements in an Apparatus for Cooling Water, of which the following is a full, clear, and exact description, such as will enable others skilled in the art to make and use the same.

My invention relates to an apparatus for cooling water by means of refrigerating pipes which are installed in a suitable conduit or tube so that the water to be cooled may be agitated and caused to circulate around said pipes and the temperature thereof reduced to near the freezing point.

In large bakeries and other establishments, it is frequently necessary to employ water as close to the freezing point as possible, and in order to do this a great many structures have been devised which have been found to be uncertain in operation and therefore only more or less dependable in carrying out their functions. With my apparatus I agitate the water in preferably endless tubular conduits in which are installed the refrigerating coils, and the water which is maintained under pressure is agitated so that it does not move in an even flow but more or less in a surging manner so that there is a complete chilling of the water to the point desired. With my apparatus the water is fed into the structure and maintained therein at the city pressure and is caused to surge by means of an agitator which is located adjacent the feed end of the structure. When a portion of the water is drawn off for use, the agitation is suspended during the period of withdrawal, so that only the cold water will be discharged, which will not become mixed with the warm water that is being received from the city main. In my experimentation, I have employed a pump for forcing the water through the coils in the conduits, but I have determined, through my said experiments, that the agitation or surging of the water, as contra-distinguished from the force or current generated by a pump, is very much more rapid and economical. I have ascertained that agitation of the water by means of the agitator will reduce the temperature to the same degree of cold at a much less cost of operation. In other words, a ½-H. P. agitator will do the work in the same time as a 3-H. P. pump; therefore the saving in power and cost of operation is approximately one to six.

I prefer to carry out my invention and accomplish the several objects thereof in substantially the manner hereinafter described and as more particularly pointed out in the claims. Reference will now be had to the accompanying drawings that form a part of this specification, in which—

Figure 1 is a side elevation of my improved cooling apparatus with the outer casing in section and the insulation removed.

Fig. 2 is a top plan of the structure shown in Figure 1.

Fig. 3 is a vertical longitudinal section taken axially through the conduits or tubes.

Fig. 4 is a transverse vertical section taken on line 4—4 of Figure 1.

Fig. 5 is a vertical end elevation of the structure at the discharge end thereof with the casing in section.

Fig. 6 is a longitudinal axial section of the agitator and its casing drawn to a larger scale.

In the drawings I have designated like parts by similar reference characters wherever the same occur throughout the several views.

As seen in the drawings, the structure comprises a suitable housing consisting of a plurality of vertically disposed posts 10 that are connected by longitudinal side pieces 11 at their upper and lower ends and the end posts are connected by upper and lower pieces. Suitable saddle blocks 13 extend horizontally from certain of the intermediate posts on one side to the opposite side of the frame and are each provided with a central concave depression or seat 14, the purpose of which will hereinafter more fully appear. The frame heretofore described is enclosed within the longitudinal side walls 15, top and bottom walls 16 and 17 respectively, and the end walls 18 and 19, the former being at the feed end and the latter at the discharge end of the structure.

Mounted in the depressions or seats 14 of the saddle blocks 13, and preferably in vertical axial alinement, one above the other, are the large tubes or conduits 20 and 21. These conduits are formed from preferably riveted spiral metal tubes and are approximately eighteen inches in diameter and sixteen feet in length so that they extend from adjacent one end to adjacent the other end of the housing. These dimensions may be modified, of course, to suit the service desired of the apparatus. At the discharge end of the structure, adjacent segments of these tubes are apertured and connected by suitable couplings 22 so that the tubes communicate with each other at this end of the structure. The ends of the tubes are each closed by head plates 23, and head plate at the feed end of the lower tube 21 is provided with a larger opening and has an elbow 24 connected to it that communicates through a suitable intermediate connection 25 with the vertical lateral stub of a T 26. One of the horizontal alining stubs of the T is connected with an opening made in the adjacent head plate 23 of the upper tube so that the tubes communicate with each other at this end of the structure.

The opposite horizontal stub of the T is closed by an end-plate 27 having a hollow cylindrical embossment 28 projecting axially therefrom through which an agitator shaft 29 passes and is journaled. The outer end of this agitator shaft extends beyond the bearings provided in the cylindrical embossment 28 and through the gland sleeve co-acting with the embossment and has secured to it a drive pulley 30 by which it may be rotated through any suitable source of power. An elongated bearing 31 projects axially from the end plate and extends through the alining horizontal studs of the T and at one end is provided with an enlargement 32 for centering and supporting the same in the stub opposite the pulley end of the agitator shaft 29. This adjacent end of the agitator shaft extends beyond the enlargement 32 where it is provided with a suitable agitator structure comprising one or more oblique blades or fins 33 mounted upon a shaft portion 34 of reduced diameter which is threaded at its outer end. The agitator is secured in position by means of a nut 35 that is screwed upon the threaded end of the agitator shaft. A water inlet pipe 36 is screwed into a threaded opening made in the upper portion of the shell of the T through which water, under city pressure, may be admitted through the T and from thence passed through the tubes 20 and 21. The head plate 23, at the end of tube 21 opposite the elbow 28 is provided with an outlet pipe 37 from which the cold water may be drawn off and conveyed to the point where it is desired to use it.

Within the tubes 20 and 21 I have provided the coils 38 that are seamless and jointless, forming continuous conduits running back and forth through the approximate entire length of each tube. These coils 38 are mounted upon a plurality of crosses or supports that consist of parallel metal strips 39 arranged vertically and extending from the upper to the lower segments of the tubes, which are intersected by parallel horizontal strips 40 disposed at right angles thereto and extending from one side to the other of the tube. The pipes forming the coils are clamped to the cross or stand just described by means of holders in the form of shorter vertical strips 41 arranged parallel, and outside the vertical strips 39, and are clamped there by means of bolts 42. Also, there are provided horizontal strips 43 arranged outside of, both above and below and parallel to the horizontal arms 40 of the cross, and are clamped thereto by means of bolts 44. These crosses or stands may be disposed at intervals throughout the length of the coils and support the latter rigidly within the tubes and space them the desired distance apart to prevent contact with the tubes and to permit free circulation of the water around the coils. The upper tube 20 has an inlet pipe 45 leading through the lower portion of its head that is connected to and communicates with the coil, and above said inlet pipe is an outlet pipe 46 leading from one of the upper pipes of the coil. Corresponding inlet and outlet pipes 47 and 48 are provided in the lower tube that are connected to the coil therein. The refrigerant may be in the form of brine or ammonia solution and is admitted to the coils through their respective inlets, and after circulating in said coils is discharged through the respective outlets.

The water discharge pipe 37 leading from the lower tube is provided, adjacent the point where the water is discharged, with a control valve or cock 49 so that when it is desired to draw off a quantity of the cold water it may be readily done by opening the valve 49. The agitator is rotated at the desired speed to agitate the water and cause a movement or circulation thereof from agitation, through the tube 20. The water then passes down through connection 22, into the lower tube 21 at the opposite end thereof, and then returns to the upper tube through the elbow and T where it is again agitated. This cycle continues until the water has been thoroughly chilled and reduced to the desired temperature.

I find that with this structure I am able to reduce the water in a comparatively short time to a temperature of 32½° Fahrenheit so that it may be used in its coldest condition in connection with the service for which it has been chilled. Whenever a quantity of the water is drawn off, the agitator is stopped because the warm water from the city main immediately begins to enter through the supply pipe 36 and as fast as the cold water, near the freezing point, is drawn out of the tubes 20 and 21 it is replaced by this warm water, and should the agitator be in operation it would have a tendency to circulate the water in the tubes and mix with the warm water from the city main. As soon as the desired quantity of water has been drawn off the control valve 49 is closed and the agitator again set in motion. In order to release any air from the tubes I have provided a small air outlet pipe 50 that leads into the upper portion of the upper tube, and the said pipe is provided with an air relief cock 51 that may be opened whenever it is desired to discharge the air.

From the foregoing it will be observed I have provided a very simple structure for the cooling of water to near the freezing point and for agitating the same under the pressure which may exist in the city water main. So long as no water is drawn off, the city water, which is warm, will not enter through the feed pipe 36, but the pressure will be maintained in the tubes because the water feed pipe is not shut off and the water is kept circulating and agitated until it has been thoroughly chilled. I am aware that cooling systems have been provided wherein the water is cooled under the pressure of a pump in the cooling system. This, however, as hereinbefore stated, is expensive both to maintain the pump and in the cost of installation, and I have, as hereinbefore set forth, been able, by actual tests, to materially reduce the cost of operation and accomplish the cooling in a much shorter time by merely agitating the water under the pressure that exists in the city water main.

What I claim is:—

1. An apparatus for cooling liquids comprising elongated horizontal tubes arranged one above the other and communicating adjacent one end, an elbow extending upwardly from an opening at the opposite end of the lower tube, a T communicating with the upper tube and connected to said elbow, refrigerating coils within said tubes, means for admitting the liquid under pressure in said tubes, and an agitator for causing the liquid under pressure to flow through said tubes and surge about said coils.

2. An apparatus for cooling liquids comprising elongated horizontal tubes arranged one above the other and communicating adjacent one end, an elbow extending upwardly from an opening at the opposite end of the lower tube, a T communicating with the upper tube and connected to said elbow, refrigerating coils within said tubes, means for admitting the liquid under pressure in said tubes, and an agitator positioned at the inlet end of the upper tube and having its shaft journaled in said T, whereby the liquid under pressure is caused to flow through said tubes and surge about said coils.

3. An apparatus for cooling liquids comprising elongated horizontal tubes arranged in vertical alinement and communicating adjacent one end, an apertured plate at the opposite end of the lower tube, an elbow secured to said plate at the aperture, a T having its stem communicating with said elbow and one of its horizontal stubs communicating with the adjacent end of the upper tube, an inlet pipe leading into said T, an outlet pipe leading out of the opposite end of the lower pipe, and a device for agitating the liquid to cause the same to surge in said tubes between the coils therein.

4. An apparatus for cooling liquids comprising elongated horizontal tubes arranged in vertical alinement and communicating adjacent one end, an apertured plate at the opposite end of the lower tube, an elbow secured to said plate at the aperture, a T having its stem communicating with said elbow and one of its horizontal stubs communicating with the adjacent end of the upper tube, an inlet pipe leading into said T, an outlet pipe leading out of the opposite end of the lower pipe, and an agitator positioned at the inlet end of the upper tube and having its shaft journaled in said T, whereby the liquid under pressure is caused to flow through said tubes and surge about said coils.

Signed at Chicago, county of Cook and State of Illinois, this 5th day of March, 1924.

JOHN M. WESTERLIN.